United States Patent Office 3,122,729
Patented Feb. 25, 1964

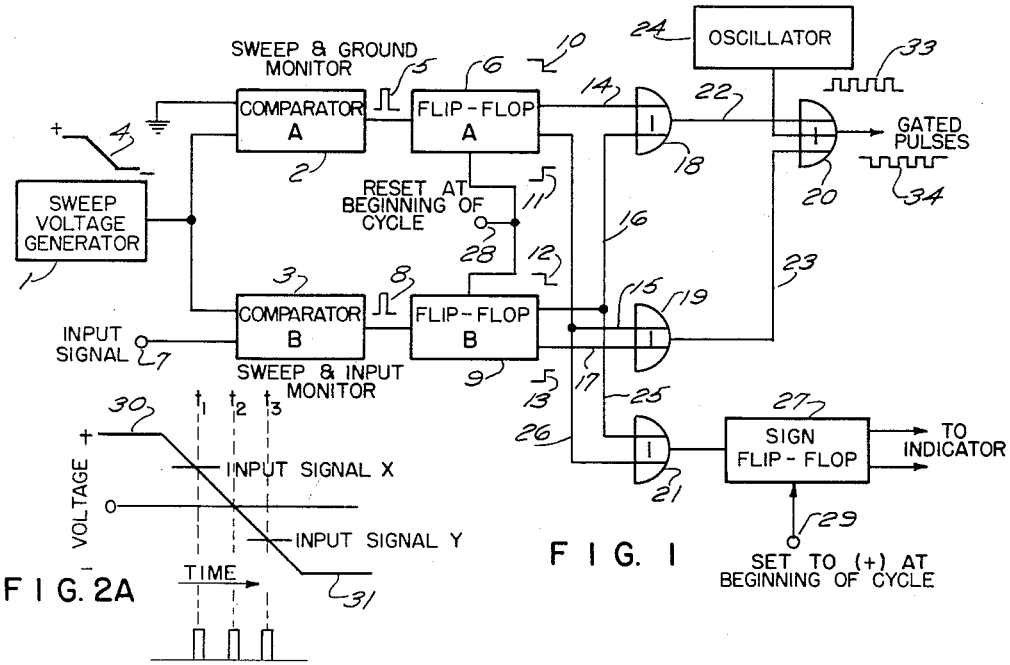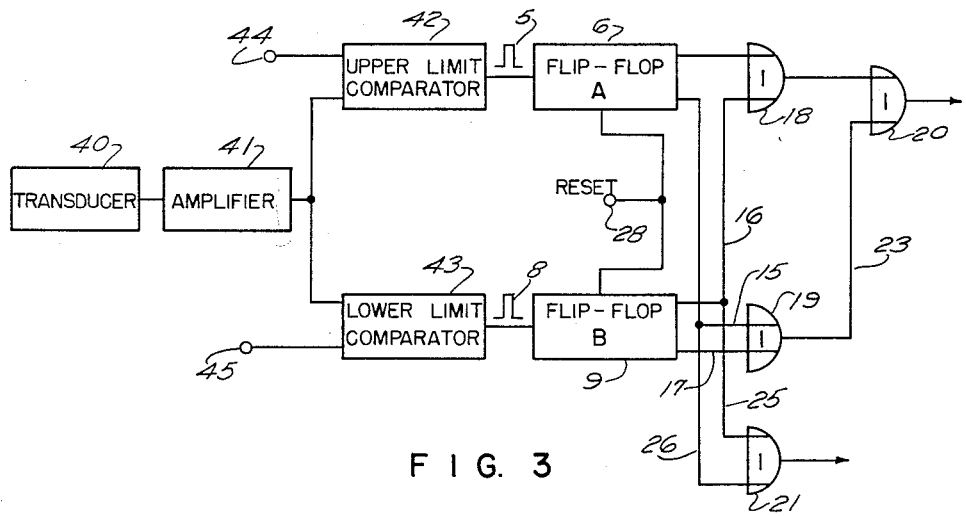

3,122,729
LOGICAL CIRCUIT
Theodore Paul Bothwell, Watertown, and Max Rosenbloom, Dorchester, Mass., assignors to Epsco, Incorporated, Cambridge, Mass., a corporation of Massachusetts
Filed Sept. 25, 1959, Ser. No. 842,280
6 Claims. (Cl. 340—248)

This invention relates in general to an electronic system employing gating devices arranged to perform logic functions, and more particularly pertains to an electronic system having three input signals, two of the signals representing upper and lower limits and the third signal being an unknown which is compared with the limits, the outputs of the system being a first gate signal indicating whether or not the unknown is between the limits and a second gate signal indicating whether the unknown exceeds the upper or lower limit when either of the limits is exceeded.

In industrial control of processes or machinery it is often desired, during the manufacturing operation, to maintain a quality, such as color, surface finish, or thickness, within designated limits or to inspect the manufactured articles during or after manufacture to determine whether an article is within tolerable limits. Transducers of various types are widely known for converting measurements of length, color, surface finish, etc., into electrical signals and the invention is intended to be used in conjunction with such signals originating from such transducing devices. When the invention is used for quality control, the outputs of the system may be employed to reject those articles which fall without the acceptable limits or may be employed to actuate an alarm or commence corrective action during a manufacturing operation where the desired quality limits are exceeded.

The basic logic gating system here disclosed employs two comparators, one of which monitors equality between the unknown signal and an upper limit signal, and the other monitoring equality between the unknown signal and a lower limit signal. So long as the unknown signal remains between those limits, the outputs of the system will indicate normal operation. However should the unknown signal achieve equality of voltage amplitude with either the upper or lower limiting signals, one of the comparators will generate an output signal pulse. The two comparators are coupled to three logical "NOR" gates, and the outputs of two of those NOR gates are connected to a fourth NOR gate. The system is arranged so that when an output pulse is generated by one of the two comparators, the fourth NOR gate provides an indication that the limits have been equaled or exceeded and the third NOR gate indicates which of the limits, upper or lower, is the relevant one.

The invention is also embodied in an electronic logic gating system for providing a gate whose duration is related to the voltage amplitude of an input signal and which system also provides an output signal indicative of the polarity of the input signal. This latter embodiment of the invention is described herein with reference to its employment in a digital voltmeter. The term "digital voltmeter" designates an instrument for measuring the voltage of an electrical signal and displaying the numerical value of the measured signal, not by means of the customary pointer and calibrated scale, but by directly presenting the numerical digits either visually in a window of the instrument or electrically at designated output terminals. In principle, the digital voltmeter operates by counting the number of cycles of oscillation of a stable oscillator which occurs between the time that a repetitively generated signal attains a reference voltage level and the time the generated signal becomes equal to the voltage of the measured signal. In order to determine the polarity of the input signal, that is, whether the input signal is positive with respect to ground, or is negative with respect to ground, sign determination is usually accomplished by manual switching. For reasons which will appear later in the text, it has been found necessary to employ special circuits in conventional digital voltmeters for the measurement of low level signals, that is, for signals near ground. A novel gate logic and voltage polarity determining system is here disclosed which employs two comparators, one of which monitors equality between the input signal and a sweep signal, the other of which monitors equality between the sweep signal and ground. The voltage of the sweep signal progresses through both polarities which the input signal may assume. Because of the linearity of the sweep signal, the amplitude of the input signal is proportional to the interval of time between the generation of an output signal from one of the comparators and the occurrence of the output signal from the other comparator. The comparators are arranged so that the order or sequence of their outputs indicates the polarity of the input signal. This has the advantage of giving automatic sign indication each time the amplitude of the signal is determined, while retaining the advantage that the measurement of the input signal voltage is independent of the sweep signal, the only requirements upon the sweep signal being that it be linear and that it extend through both polarities which the input signal may assume. In a specific embodiment of the invention, two logical "NOR" gates operate to furnish a gating signal to a third NOR gate, the duration of the gating signal being a measure of the amplitude of the input signal, and a fourth "NOR" gate determines the polarity of the measured signal. Despite the simplicity of the system, no critical timing is involved, and the system automatically resolves the usual confusion in prior gating circuits where pulses occur very near one another due to the input signal having a voltage differing slightly from zero.

The invention, together with its arrangement and mode of operation, can be apprehended by reference to following detailed description when considered in conjunction with the accompanying drawings wherein:

FIG. 1 is a schematic representation of the invention employed to provide a gate whose duration is related to the voltage amplitude of an input signal;

FIGS. 2A and 2B are waveforms illustrating the operation of the invention; and

FIG. 3 is a schematic representation of the invention employed to indicate when an input signal becomes equal to upper or lower reference levels.

Referring now to FIG. 1 which depicts in diagrammatic form a preferred embodiment of the invention, there is shown a sweep generator 1 having its output fed in parallel to a comparator A, represented by block , and a comparator B, represented by block 3. The comparators are preferably of the type disclosed in the copending application of Theodore Paul Bothwell, entitled "Signal Responsive Circuit," Serial No. 816,330, filed May 27, 1959, now Patent No. 3,054,910, but any other suitable comparator device may be employed which compares two electrical signals and provides an output indicative of the time that voltage equality between the compared signals occurs. Sweep generator 1 furnishes a sweep voltage, otherwise known as a ramp voltage, which commences at one voltage level and changes at a constant rate to a second voltage level. Sweep generators capable of producing linear ramp voltages are well known and a detailed description of such a device is not given here, since the particular construction of the sweep generator employed is not, per se, material to the invention, just so the sweep generator provides a linear ramp voltage. Comparator A provides an output pulse when the ramp voltage is equal to ground potential, that output pulse constituting the input to a bistable circuit 6, represented by the block designated flip-flop A. Comparator B monitors voltage equality between the ramp voltage and an input signal applied at terminal 7 and upon the occurrence of equality between those inputs, provides an output pulse 8 which is impressed upon a second bistable circuit 9, represented by the block designated flip-flop B. The bistable circuits 6 and 9 may be Eccles-Jordan trigger circuits or equivalent devices, possessing two conditions of stable equilibrium. Such circuits, generally employ a pair of tubes or a pair of transistors arranged so that when one of the tubes or transistors is conducting the other tube or transistor of the pair is cut off. The bistable circuit remains in one or the other of these two conditions until some action occurs which causes the non-conducting tube or transistor to conduct. The tubes or transistors then reverse their states and remain in the new condition until another action occurs which causes the bistable circuit to return to its initial state. Because of this sudden reversal or "flopping" from one state of equilibrium to the other, this type of circuit is often refered to as a flip-flop circuit. A bistable circuit can be caused to change from one condition of equilibrium to its other equilibrium state by impressing a triggering pulse, which may be positive or negative, upon one or the other of the pair of tubes or transistors. For purposes of exposition it will be assumed that the output from the comparators A and B are positive pulses as indicated by the pulses 5 and 8 and that the flip-flop circuits A and B are caused to change their equilibrium status by the leading edge of the waveforms 5 and 8. Two output signals are simultaneously available from a bistable circuit, one of the outputs being a negative going wave indicated by waveforms 10 and 12 and the other output being a positive going wave indicated by waveforms 11 and 13. By way of example, the negative going waveforms 10 and 12 may represent a change from a level of +5 volts to a level of −5 volts and the positive going waveforms 11 and 13 may represent a change of −5 volts to +5 volts. In the initial condition of flip-flop A it is assumed that the output taken along conductor 14 is initially at the +5 volt level and the output taken along conductor 15 is initially at the −5 volt level. Similarly, it is assumed that in the initial condition of flip-flop B the output at conductor 16 is at the −5 volt level. Since the +5 volt level and the −5 volt level of a switching network may be arbitrarily represented by the binary digits "Zero" and "One" the +5 volt level will be designated by "Zero." The logic switching function of the system is performed by four "NOR" gates symbolically represented at 18, 19, 20, and 21. Switching (or Boolean) algebra constitutes an abbreviated technique for representing the two logical conditions at various points in a switching network. Although the digits "Zero" and "One" are employed here, they do not, necessarily, represent the two digits of binary arithmetic. A particular "Zero" might represent a negative voltage level and a particular "One" may represent a positive voltage level at the output of a switch, regardless of whether or not the switch had to be on or off to achieve the voltage level in question and regardless of whether or not a binary arithmetical operation was being performed. In general, the "Zero" and "One" of switching algebra represents the two (and only two) possible states of simple logic. Thus, in simple logic, a letter symbol, such as A or B, can have but one of two possible values, "Zero" or "One." A NOR gate is a device which performs the inverse function of an AND gate. Referring to the truth tables below, which tabulate all possibilities for the NOR and AND functions,

| AND | | | NOR | | |
|---|---|---|---|---|---|
| A | B | A·B | A | B | $\overline{A+B}$ |
| 0 | 0 | 0 | 0 | 0 | 1 |
| 0 | 1 | 0 | 0 | 1 | 1 |
| 1 | 0 | 0 | 1 | 0 | 1 |
| 1 | 1 | 1 | 1 | 1 | 0 | it can be seen that the output of a NOR gate is the inverse of the output of an AND gate. For NOR gate circuit design, the reader is referred to the February 5, 1958, issue of Electronic Design, volume 6, pages 2–6 and page 29. Referring again to FIG. 1, it can be seen that the inputs to NOR gate 18 are transmitted along the conductors 14 and 16 which are connected to the outputs of the bistable circuits A and B, initially at the +5 voltage level or in the "One" condition. The inputs to the NOR gate 19 are transmitted along the conductors 15 and 17, those conductors being coupled to the outputs of flip-flop circuits A and B which are initially in the "Zero" condition. The output of NOR gate 18, initially a "Zero," is transmitted along conductor 22 to the NOR gate 20. The output of NOR gate 19, initially a "One" is, similarly, transmitted along conductor 23 to the NOR gate 20. Nor gate 20 is arranged in known manner so that the gate is inhibited when its output is a "One" and the gate is open when its output is a "Zero." The NOR gate 20, therefore, functions to permit the output of an oscillator 24 to be transmitted through the gate when that gate is opened and to prevent the ouput of oscillator 24 from being transmitted when the gate is inhibited. Oscillator 24 is in essence a clock which generates an electrical timing signal. The output of oscillator 24 is, preferably, a series of repetitively generated pulses, the pulses being analogous to the ticking of a mechanical clock. The inputs to NOR gate 21 are transmitted along conductors 25 and 26, the conductor 25 being coupled to the output of flip-flop B which is initially a "One," and conductor 26 being coupled to the output of flip-flop A which is initially "Zero." The output of NOR gate 21 is employed to control a bistable circuit designated by numeral 27.

FIG. 2A represents the voltage variation of sweep signal 4 plotted along a time axis. It will be observed that the sweep signal is initially at a positive voltage level 30 and then descends linearly to a negative voltage level 31. Since the input signal impressed at terminal 7 of FIG. 1 may assume any value between the uppermost positive level 30 and the lowermost negative level 31 of the sweep voltage, two input signals have been arbitrarily selected to indicate the operation of the system, one input signal having a positive polarity and the other input signal being of negative polarity. As the sweep signal descends in voltage from its most positive value, the sweep signal becomes equal to the positively poled input signal X at time $t_1$, crosses the zero potential axis at time $t_2$, and becomes equal to the negatively poled input signal Y at time $t_3$. Assuming that a pulse is generated at times $t_1$, $t_2$, and $t_3$, as indicated in FIG. 2B, the sequence in which the pulses are generated is indicative of the polarity of the input signal. It is of course clear that since the input signal at any one moment or during any one cycle, must be either negatively poled or positively poled, the level of the input signal will be either above or below the zero reference voltage axis. Assuming the input signal to be of positive polarity, its level will be above the zero reference axis and therefore the pulses will be generated at times $t_1$ and $t_2$; where the input signal is of negative polarity, its voltage level will be below the zero reference axis and two pulses will be generated, one at time $t_2$ and the other at time $t_3$. Hence the generation of a pulse at time $t_1$ followed by a pulse at time $t_2$ indicates an input signal of positive polarity and the generation of a pulse at time $t_2$ followed by a pulse at $t_3$ indicates a negatively poled input signal.

*Operation*

At the beginning of a cycle of operation of the specific embodiment of the invention, shown in FIGURE 1, a reset signal is impressed at terminal 28 to insure that bistable circuits 6 and 9 are in their initial states and simultaneously a reset signal is applied to terminal 29 causing flip-flop 27 to assume an initial condition causing its output to the digital voltmeter indicator to be indicative of a positive polarity. The voltage of sweep signal 4 furnished by generator 1 is now at its uppermost positive voltage level, indicated at 30 in FIG. 2A. The condition of the system after being reset, i.e. at the beginning of a cycle, is as follows: both inputs to NOR gate 18 are "1's"; both inputs to NOR gate 19 are "0's"; the output signal from NOR gate 18 is "0" and the output signal from NOR gate 19 is "1" so that NOR gate 20 is inhibited, wherefore the timing pulses generated by oscillator 24 are prevented from passing through gate 20; the input to NOR gate 21 along conductor 25 is "1" and the input along conductor 26 is "0" causing the output of gate 21 to be a "1."

Assuming that a positive polarity input signal, having a voltage amplitude represented by the level of input signal X in FIG. 2A, is impressed at terminal 7, then at time $t_1$, when the sweep voltage is equal to the input signal voltage, comparator B generates a pulse 8, the leading edge of that signal causing flip-flop B to change to its second equilibrium state whereupon the signal along conductors 16 and 25 switches from "1" to "0" and the signal along conductor 17 switches from "0" to "1." The following action therefore ensues: the output from NOR gate 18 changes from "0" to "1"; the inputs to NOR gate 19 become a "0" and a "1," but its output remains a "1"; two of the three inputs to NOR gate 20 are therefore "1's," causing that gate to respond to the timing pulses on its third input (the clock pulses 33), the output of NOR gate 20 being a simple inverse of its third input. That is, the clock pulses 33 appear at the output of NOR gate 20, but are inverted in polarity as indicated by the output pulses 34. The inputs to NOR gate 21 are "0's", wherefore its output remains a "1" and the indicator continues to show a + sign since flip-flop 27 is unaffected. At time $t_2$, when the sweep voltage becomes equal to zero or ground potential, comparator A generates a pulse 5 whose leading edge causes flip-flop A to change to its second equilibrium state whereupon the signal on conductor 14 switches from "1" to "0" and the signal on conductors 15 and 26 switches from "0" to "1." The condition of the system now is as follows: the inputs to NOR gate 18 are both "0's" and the output of that gate remains a "1"; the inputs to NOR gate 19 are both "1's" causing its output to switch from "1" to "0"; the inputs to NOR gate 20 are "1" and "0" causing that gate to be inhibited and preventing the timing pulses 33 from being gated out; and the inputs to NOR gate 21 are "1" and "0" so that its output remains an undisturbed "1." From the foregoing analysis of operation, it is seen that timing pulses 33 are permitted to pass through gate 20 between times $t_1$ and $t_2$, the gate being inhibited at all other times so that by counting the number of timing pulses gated out the voltage of the input signal is uniquely determined. The operation of the NOR gates are recapitulated in tabulated form below. As applied to NOR gates 18, 19, and 21, columns designated A are the inputs derived from flip-flop A and columns designated B are inputs derived from flip-flop B. In the case of NOR gate 20, column A tabulates the inputs from gate 18, and column B tabulates inputs from gate 19. It is to be understood that the clock pulses 33 in actuality constitute a third input to NOR gate 20, which third input alternates between "1" and "0" at the clock rate.

| GATE 18 | | | | GATE 19 | | | |
|---|---|---|---|---|---|---|---|
| Time | Input A | Input B | Output | Time | Input A | Input B | Output |
| Initial | 1 | 1 | 0 | Initial | 0 | 0 | 1 |
| $t_1$ | 1 | 0 | 1 | $t_1$ | 0 | 1 | 1 |
| $t_2$ | 0 | 0 | 1 | $t_2$ | 1 | 1 | 0 |
| Reset | 1 | 1 | 0 | Reset | 0 | 0 | 1 |

| GATE 20 | | | | GATE 21 | | | |
|---|---|---|---|---|---|---|---|
| Time | A Gate 18 | B Gate 19 | Condition of Gate 20 | Time | Input A | Input B | Output |
| Initial | 0 | 1 | Inhibited | Initial | 0 | 1 | 1 |
| $t_1$ | 1 | 1 | Open | $t_1$ | 0 | 0 | 1 |
| $t_2$ | 1 | 0 | Inhibited | $t_2$ | 1 | 0 | 1 |
| Reset | 0 | 1 | do | Reset | 0 | 1 | 1 |

From a perusal of the tabulation under gate 21, it is seen that the output of the gate remains a "1" at all times when the input signal applied at terminal 7 is of positive polarity and consequently, the indicator which is initially set to display a + sign is unaffected since sign flip-flop 27 remains in its initial equilibrium state.

The foregoing description of a cycle of operation assumed a positive polarity input signal. It will now be assumed that an input signal of negative polarity having a voltage amplitude represented by the level of signal Y in FIG. 2A is impressed at terminal 7 and a cycle of operation will be described. At the commencement of the cycle, the voltage of sweep signal 4 is at its uppermost positive voltage level and the condition of the system is as follows: both inputs to NOR gate 18 are "1's"; both inputs to NOR gate 19 are "0's"; the output signal from NOR gate 18 is "0" and the output signal from NOR gate 19 is "1," inhibiting NOR gate 20 which in turn prevents timing pulses 33 from being gated out; the input to NOR gate 21 along conductor 25 is "1" and input along conductor 26 is "0" causing the output of gate 21 to be a "1." The sweep signal 4 descends (see FIG. 2A) and at time $t_2$ the sweep signal voltage becomes equal to ground potential, causing comparator A to generate a pulse 5, the leading edge of that pulse triggering flip-flop A which thereupon changes to its second equilibrium state and causes the signal along conductor 14 to switch from "1" to "0" and the signal along conductors 15 and 26 to switch from "0" to "1." The following action ensues: the output from NOR gate 18 changes from "0" to "1"; the inputs to NOR gate 19 become a "0" and a "1" but its output remains a "1"; the input signals from gates 18 and 19 to NOR gate 20 are therefore "1's," causing gate 20 to respond to the timing pulses 33 on its third input and gate out pulses 34; the two inputs to NOR gate 21 are now "1's" wherefore its output becomes a "0," causing sign flip-flop 27 to be triggered to its other stable state and set the indicator to display a − sign. At time $t_3$, when the sweep voltage becomes equal to input signal Y, comparator B generates a pulse 8 whose leading edge causes flip-flop B to change to its second equilibrium state, whereupon the signal on conductor 17 switches from "0" to "1" and the signal on conductor 16 and 25 switches from "1" to "0." The condition of the system then is as follows: the inputs to NOR gate 18 are both "0" so that the output of that gate remains a "1"; the inputs to NOR gate 19 are both "1" causing its output to switch from "1" to "0"; the inputs to NOR gate 20 are "1" and "0" causing that gate to be inhibited and preventing timing pulses 33 from being gated out; and the inputs to NOR gate 21 are "1" and "0" causing its output to switch from "0" to "1," but the sign flip-flop 27 cannot be again triggered until it is reset by a signal applied at terminal 29 so that the indicator continues to show a — sign. The operation of the NOR gates, when the input signal at terminal 7 is of negative polarity, are recapitulated in tabulated form below. As applied to NOR gates 18, 19, and 21, columns designated A are the inputs derived from flip-flop A and columns designated B are inputs derived from flip-flop B. In the case of NOR gate 20, column A tabulates the inputs from gate 18, column B tabulates inputs from gate 19, and clock pulses 33, while not included in the tabulation, actually are a third input to NOR gate 20, that third input alternating between "1" and "0" at the clock rate. Also, it should be understood that the "reset" time marks the end of one cycle and the beginning of another so that the "reset" time is the same as the "initial" time.

| GATE 18 | | | | GATE 19 | | | |
| --- | --- | --- | --- | --- | --- | --- | --- |
| Time | Input A | Input B | Output | Time | Input A | Input B | Output |
| Initial | 1 | 1 | 0 | Initial | 0 | 0 | 1 |
| $t_2$ | 0 | 1 | 1 | $t_2$ | 1 | 0 | 1 |
| $t_3$ | 0 | 0 | 1 | $t_3$ | 1 | 1 | 0 |
| Reset | 1 | 1 | 0 | Reset | 0 | 0 | 1 |

| GATE 21 | | | | GATE 20 | | | |
| --- | --- | --- | --- | --- | --- | --- | --- |
| Time | Input A | Input B | Output | Time | A Gate 18 | B Gate 19 | Condition of Gate 20 |
| Initial | 0 | 1 | 1 | Initial | 0 | 1 | Inhibited. |
| $t_2$ | 1 | 1 | 0 | $t_2$ | 1 | 1 | Open. |
| $t_3$ | 1 | 0 | 1 | $t_3$ | 1 | 0 | Inhibited. |
| Reset | 0 | 1 | 1 | Reset | 0 | 1 | Open. |

From a perusal of the tabulations under gate 21, it is observed that the output of the gate switches from "1" to "0" at time $t_2$ when the input signal applied at terminal 7 is of negative polarity, and consequently, the indicator which is initially set to display a + sign is caused, by the triggering of flip-flop 27, to display a — sign.

FIG. 3 schematically represents the invention embodied in a logic gating system for the control of processes or machinery where it is desired to maintain a measurement, such as pressure, lengths, width, etc., within tolerable limits, or where a quality such as color or surface finish is to be maintained within acceptable standards. A transducer 40 is shown which converts the quality or measurement into an electrical signal and an amplifier 41 is provided for enhancing the output of the transducer. The amplifier and the transducer may be of any suitable types and are not considered to be a part of the present invention. It will be assumed that the signal obtained from the output of amplifier 41 is to be maintained with upper and lower limits and that an alarm is to be actuated when the output signal of the amplifier becomes equal to either of those limits. The output signal of amplifier 41 is fed in parallel to an upper limit comparator 42 and a lower limit comparator 43. The comparator 42 has a second input terminal 44 at which is impressed an upper limit reference signal; the comparator 43 has a second input terminal 45 at which is impressed a lower limit reference signal. The comparator may be any suitable device which compares two electrical signals and provides an output indicative of the time that equality between the compared signals occurs but, preferably, the comparators are of the type disclosed in the aforementioned copending application of Paul Bothwell. The remainder of the system is similar to that shown in FIG. 1, except that the oscillator 24, and the sign flip-flop 27 are omitted. If the output signal from amplifier 41 becomes equal in voltage to the upper reference signal, then comparator 42 produces an output pulse which triggers flip-flop 4. Conversely, if the output signal from amplifier 41 becomes equal in voltage to the lower reference signal, then comparator 43 produces an output pulse which triggers flip-flop 9. Where either of the flip-flops 4 or 9 is triggered by a pulse from the associated comparator, NOR gate 20 is caused to be switched from a "1" to a "0" thereby actuating an alarm device 4 (not shown). The NOR gate 21 provides an output indicating which of the limits, upper or lower, has been attained by the output signal from amplifier 41. Thus where the alarm is initiated by a pulse from comparator 42, then the output from NOR gate 21 is a "1," but if the alarm is initiated from a pulse from comparator 43, then the output from NOR gate 21 is a "0." Therefore, if the alarm is actuated and the output of NOR gate 21 is "1," then the upper limit has been equalled; if the alarm is actuated and the output of NOR gate 21 is "0," then the lower limit is the relevant one. In view of actuating an alarm, the output from gate 20 in conjunction with the output from gate 21 may be utilized to actuate machinery to commence corrective action until the output signal from amplifier 41 is again between the reference limits.

What is claimed is:

1. A logic gating system for determining when an input signal exceeds upper or lower limits comprising, first comparator means for comparing said input signal with an upper reference level, said first comparator means providing a first pair of output switching signals when said input signal is below said upper reference level and causing said output signals to change when said input signal attains equality with said upper reference level, second comparator means for comparing said input signal with a lower reference level, said second comparator means providing a second pair of output switching signals when said input signal is above said lower reference level and causing said output signals to change when said input signal attains equality with said lower reference signal, first gating means connected to the outputs of said first and second comparator means and responsive to a change in said output switching signals, for generating an output signal when said input signal attains equality with either said upper or lower reference level, and second gating means connected to the outputs of said first and second comparator means and responsive to a change in said output switching signals for indicating which of the reference levels has been attained by said input signal.

2. A logic gating system comprising means for generating a sweep signal whose voltage varies with time, comparator means for providing first and second output signals indicative of the difference in the time of occurrence of a predetermined voltage relationship between an input signal and said sweep signal and the time that said sweep signal attains a reference voltage level, means responsive to said first and second output signals for providing a gating signal whose duration is indicative of said difference in time, and means responsive to the order of occurrence of said first and second output signals for indicating the polarity of said input signal referred to said reference voltage level.

3. A logic gating system for providing an indication of the amplitude and polarity of an input signal comprising a generator for furnishing a bipolar sweep signal, means for providing a first signal indicative of the time of occurrence of a predetermined amplitude relationship between said sweep signal and said input signal, means for providing a second signal indicative of the time that said input signal attains a predetermined reference potential, means responsive to said first and second signals for generating a gating signal, and means for indicating the order of occurrence of said first and second signals.

4. A logic gating system for providing an indication of the amplitude and polarity of an input signal comprising means furnishing a bipolar sweep signal, a reference potential source, means for providing a first signal indicative of a predetermined amplitude relationship between said sweep signal and said input signal, means for providing a second signal indicative of a predetermined amplitude relationship between said sweep signal and said reference potential, means responsive to said first and second signals for generating a gating signal, and means for indicating the order of occurrence of said first and second signals.

5. A logic gating and voltage polarity determining system comprising means for generating a sweep signal, means for providing a first output signal indicative of the time said sweep signal attains a reference potential, means for providing a second output signal whose occurrence in time is indicative of voltage equality between an input signal and said sweep signal, a gating device, means responsive to said first and second output signals for providing gate operating signals to said gating device to cause said gating device to be placed in one condition of operation during the time interval between said first and second output signals, and means responsive to the sequence of said first and second output signals for providing an output indicative of the polarity of said input signal with reference to said reference potential.

6. A logic gating and voltage polarity determining system for providing a gate for a period indicative of the voltage amplitude of an input signal and simultaneously determining the polarity of the input signal comprising a sweep generator for generating a ramp voltage, a first comparator for supplying an output signal indicative of the time that said ramp voltage attains a reference voltage level, a second comparator for supplying an output signal indicative of the time that said ramp voltage and said input signal voltage are equal, a first bistable circuit coupled to said first comparator and arranged to change from its initial stable state to its second stable state upon reception of an output signal from said first comparator, a second bistable circuit coupled to said second comparator and arranged to change from its initial stable state to its second stable state upon reception of an output signal from said second comparator, means coupled to said first and second bistable circuits and responsive to the sequence of output signals from said first and second comparators for providing a signal indicative of the polarity of said input signal, and means responsive to a change in state of said first and second bistable circuits for providing a gate whose duration is a measure of the voltage amplitude of said input signal.

References Cited in the file of this patent
UNITED STATES PATENTS

| | | |
|---|---|---|
| 2,745,090 | Grillo | May 8, 1956 |
| 2,786,136 | Lubkin | Mar. 19, 1957 |